United States Patent [19]

Miller

[11] Patent Number: 5,184,693
[45] Date of Patent: Feb. 9, 1993

[54] VEHICLE HYDRAULIC POWER STEERING SYSTEM

[75] Inventor: Laurence L. Miller, West Lafayette, Ind.

[73] Assignee: TRW Inc., Lyndhurst, Ohio

[21] Appl. No.: 667,978

[22] Filed: Mar. 12, 1991

[51] Int. Cl.⁵ .............................................. B62D 5/08
[52] U.S. Cl. ...................................... 180/143; 91/452; 417/300
[58] Field of Search .................... 180/132, 141, 149; 91/452; 417/300

[56] References Cited

U.S. PATENT DOCUMENTS

| | | | |
|---|---|---|---|
| 3,931,711 | 1/1976 | Rau et al. | 180/132 |
| 4,691,797 | 9/1987 | Miller | 180/141 |
| 4,768,605 | 9/1988 | Miller et al. | 180/143 |
| 4,872,393 | 10/1989 | Rabe et al. | 91/375 A |
| 4,942,803 | 7/1990 | Rabe et al. | 91/370 |

OTHER PUBLICATIONS

SAE Technical Paper No. 852250, 1985.
SAE Technical Paper No. 880705, Mar. 4, 1988.
SAE Technical Paper No. 880707, Mar. 4, 1988.

Primary Examiner—Mitchell J. Hill
Attorney, Agent, or Firm—Tarolli, Sundheim & Covell

[57] ABSTRACT

A power steering motor is operatively connectable with steerable vehicle wheels for steering the vehicle wheels. An actuatable power steering valve has a neutral position in which fluid flows through the steering valve to a fluid reservoir and an actuated position in which fluid flows through the steering valve to the steering motor. A main conduit conducts fluid from the outlet port of a pump to the steering valve. A return conduit conducts fluid from the steering valve to the reservoir when the steering valve is in its neutral position and in its actuated position. An orifice is located in the return conduit. A bypass valve bypasses fluid from the main conduit to the reservoir. The bypass valve is controlled in response to a pressure drop across the orifice located in the return conduit.

14 Claims, 5 Drawing Sheets

VEHICLE HYDRAULIC POWER STEERING SYSTEM

TECHNICAL FIELD

The present invention relates to a hydraulic power steering system for a vehicle.

BACKGROUND OF THE INVENTION

A typical hydraulic power steering system for a vehicle includes an engine-driven hydraulic fluid pump having an inlet port connected in fluid communication with a hydraulic fluid reservoir. The pump has an outlet port connected in fluid communication through a main conduit with a power steering valve. The typical vehicle hydraulic power steering system also includes a power steering motor operatively connected with steerable vehicle wheels. When the steering valve is actuated, it directs fluid flow from the pump to the power steering motor. The power steering motor then operates to steer the vehicle wheels. The power steering valve may be an open-center valve having a neutral position in which fluid flow from the pump flows through the steering valve and back to the fluid reservoir.

The power steering pump is driven by the vehicle engine. Horsepower is unnecessarily consumed when excess fluid from the pump flows through an open-center steering valve, for example in a nonsteering condition of the vehicle. A known hydraulic power steering system also includes a bypass valve which bypasses fluid from the main conduit to the fluid reservoir. An orifice is usually located in the main conduit to provide a hydraulic fluid pressure signal which varies as the amount of fluid flow through the orifice varies. The hydraulic fluid pressure signal from the orifice communicates with the bypass valve to control operation of the bypass valve. The bypass valve is controlled to direct excess fluid flow from the pump to the reservoir. When the bypass valve directs excess fluid flow from the pump to the reservoir, the excess fluid does not flow through the steering valve. This results in minimizing horsepower consumption. U.S. Pat. No. 4,691,797 discloses a typical hydraulic power steering system having a bypass valve.

SUMMARY OF THE INVENTION

In accordance with the present invention, a power steering motor is operatively connected with steerable vehicle wheels to steer the vehicle wheels. The power steering motor includes a piston which divides a chamber into two fluid chambers. When one fluid chamber is pressurized, the piston moves axially in one direction to steer the vehicle wheels in one direction. When the other fluid chamber is pressurized, the piston moves axially in the opposite direction to steer the vehicle wheels in the opposite direction.

A power steering pump has an inlet port in communication with a fluid reservoir and an outlet port in communication with an open-center power steering valve through a main conduit. The open-center power steering valve has a neutral position in which fluid flows through the steering valve and back to the reservoir through a first return conduit. The steering valve has an actuated position in which fluid is directed through the steering valve to one of the fluid chambers of the steering motor and fluid is directed from the other fluid chamber through the steering valve to the reservoir through a second return conduit.

An orifice is located in the first return conduit. A bypass valve bypasses fluid from the main conduit to the reservoir. The bypass valve is controlled in response to a fluid pressure signal indicative of the pressure drop across the orifice located in the first return conduit. The bypass valve is controlled by the fluid pressure signal so that the fluid flow rate through the orifice is maintained at a relatively low constant predetermined value during steering and nonsteering conditions. Since the fluid flow rate through the orifice is maintained at the relatively low constant predetermined value, fluid flows through the steering valve at a relatively low fluid flow rate in a nonsteering condition of the vehicle. When fluid flows through the steering valve at a relatively low fluid flow rate, horsepower consumption due to the fluid flow through the steering valve is at a relatively low value. Thus, by maintaining the fluid flow rate through the orifice at the relatively low constant predetermined value, horsepower consumption by the engine-driven pump is at a relative low value.

BRIEF DESCRIPTION OF THE DRAWINGS

The foregoing and other features of the present invention will become apparent to one skilled in the art upon a consideration of the following description of preferred embodiments of the present invention made with reference to the accompanying drawings, wherein.

DETAILED DESCRIPTION OF PREFERRED EMBODIMENTS

Figure 1:
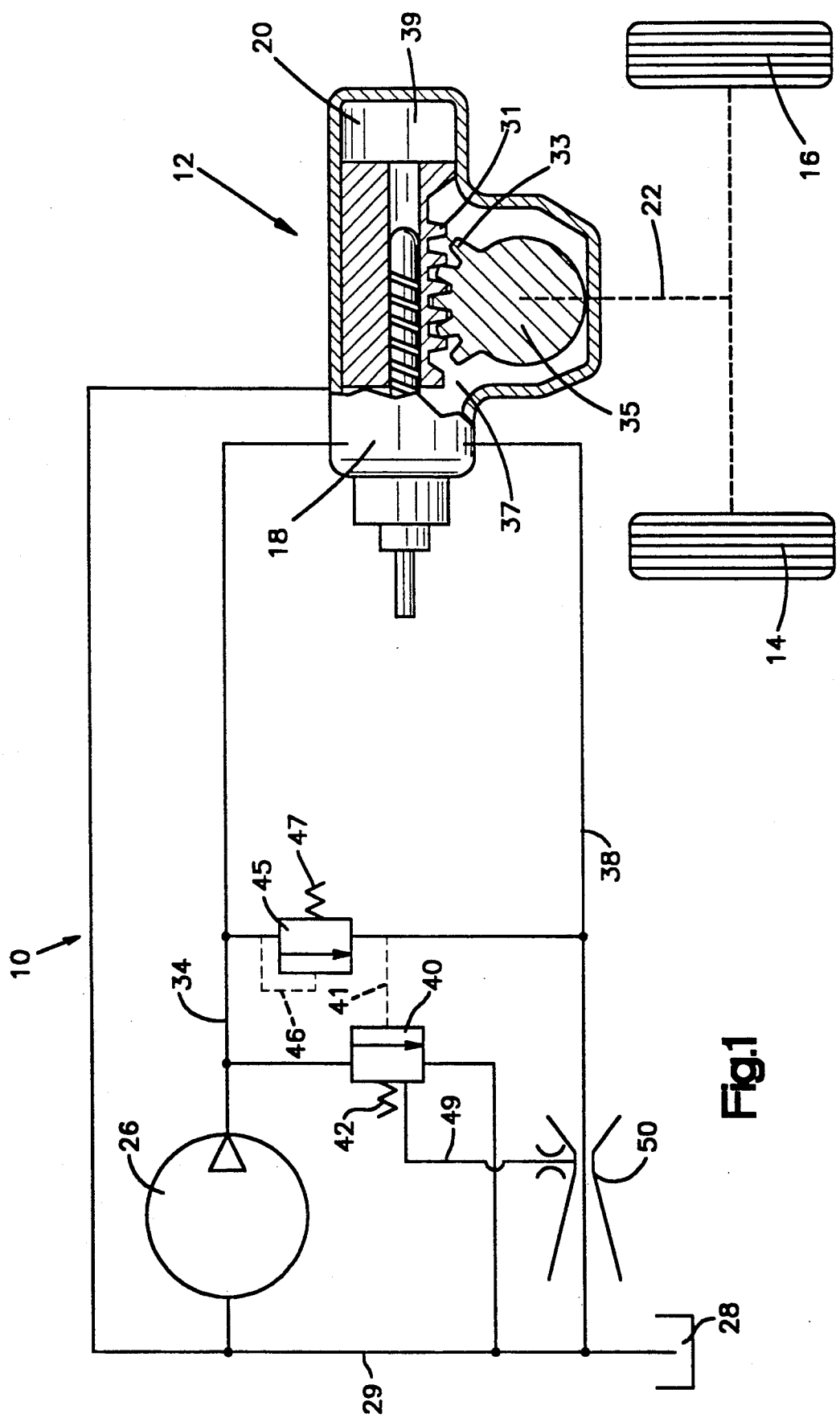
FIG. 1 is a schematic illustration of a vehicle hydraulic power steering system constructed in accordance with the present invention.

A vehicle hydraulic power steering system 10 for providing power assist to turn steerable wheels 14, 16 of a vehicle is illustrated in FIG. 1. The vehicle hydraulic power steering system 10 includes a hydraulic power steering mechanism 12 which is operable to turn the steerable wheels 14, 16 in response to turning a vehicle steering wheel (not shown).

Pump

A hydraulic power steering pump 26 supplies hydraulic fluid from a fluid reservoir 28 to the power steering mechanism 12. The power steering pump 26 is normally a fixed displacement pump which is driven by the vehicle engine (not shown). Preferably, the pump 26 is a Vickers VT7 Series pump. The pump 26 is sized, i.e., has a displacement which will supply a steering motor with sufficient pressurized fluid to steer the vehicle at comfortable levels of operator effort during parking at minimum engine speed. Hence, at higher engine speeds, the pump 26 has the capability of suppling an excess of pressurized fl ·d to the steering motor. The inlet port of the pump 26 communicates through a fluid conduit 29 with the reservoir 28. The outlet port of the pump 26 communicates through a main fluid conduit 34 with the power steering mechanism 12, a pressure relief valve 45 and a flow dividing bypass valve 40. Fluid conduits used in the present application including the fluid conduit 29 and the fluid conduit 34 are preferably manufactured by Aeroquip.

The power steering mechanism 12 includes an open-center, power steering directional control valve 18 and a hydraulic power steering motor 20. The steering valve 18 may be constructed in any known manner, but preferably is constructed as disclosed in U.S. Pat. No. 4,872,393. The steering valve 18 communicates with the main fluid conduit 34 and a return fluid conduit 38. The return fluid conduit 38 directs fluid from the steering valve 18 to the reservoir 28.

Power Steering Motor

Figure 2:
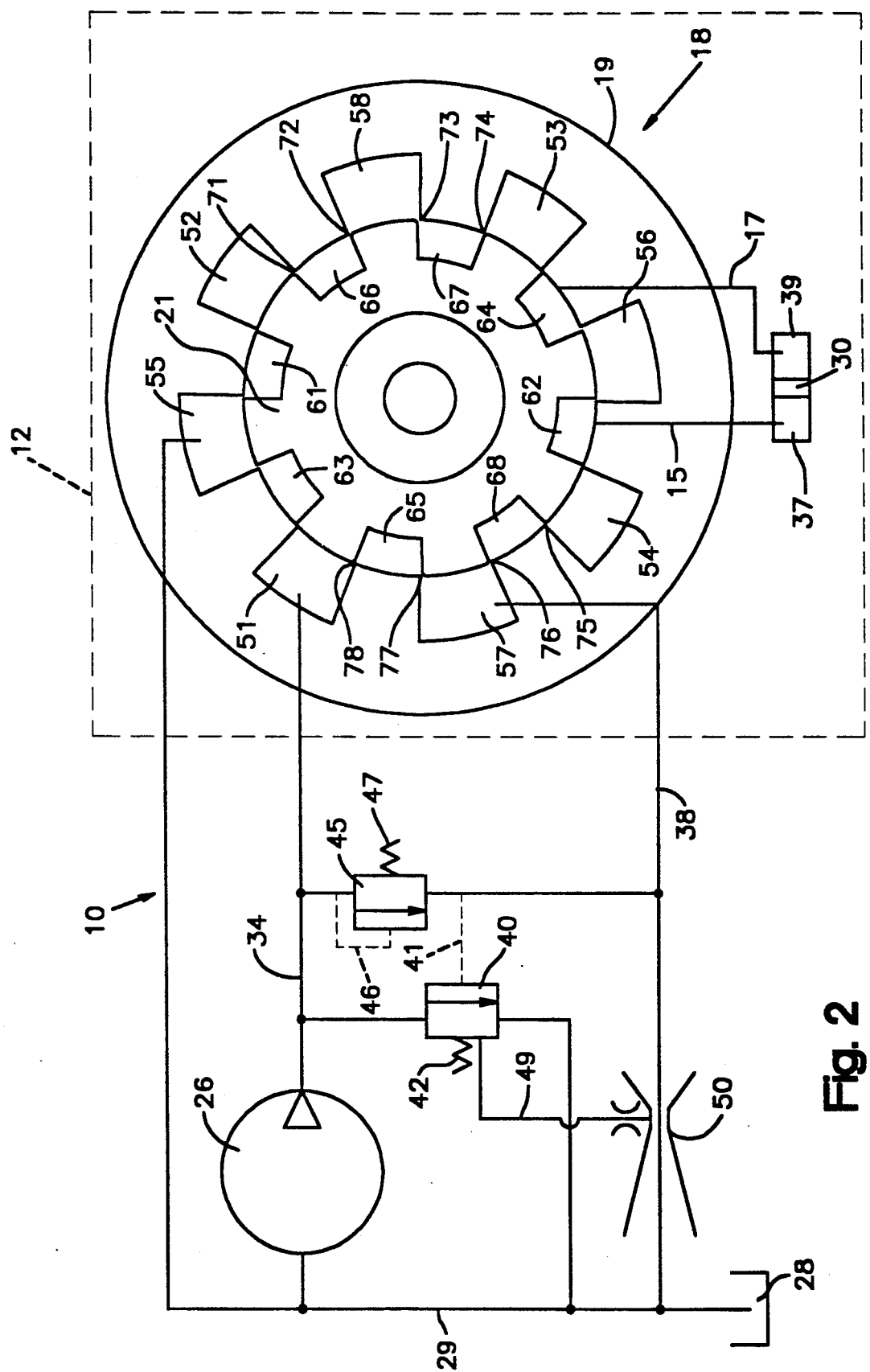
FIG. 2 is a schematic illustration of the power steering system of FIG. 1 showing an actuatable steering valve in the steering system in a neutral position.

The construction of the power steering motor 20 may vary. Referring to FIG. 2, the illustrated power steering motor 20 includes a piston 30 which divides a chamber of the power steering motor 20 into two chamber portions 37, 39. The piston 30 has rack teeth 31 (FIG. 1) which meshingly engage gear teeth 33 disposed on a sector shaft 35. The sector shaft 35 is operatively connected through a vehicle steering linkage 22 to the steerable wheels 14, 16 to turn the steerable wheels 14, 16 in response to turning of the sector shaft 35. The steering linkage 22 is known and shown schematically in FIG. 1.

When the piston 30 moves under the influence of pressurized hydraulic fluid, axially in one direction, the sector shaft 35 is rotated in one direction to turn the steerable wheels 14, 16 in one direction. When the piston 30 moves axially in the other direction, the sector shaft 35 is rotated in the opposite direction to turn the steerable wheels 14, 16 in the opposite direction. An example of a power steering motor which preferably is used in the present application is disclosed in U.S. Pat. No. 4,872,393.

Relief Valve

The conduit 34 also communicates with the inlet port of the pressure relief valve 45. The relief valve 45 is of known construction and is urged toward an open condition by a fluid pressure signal conducted from the conduit 34 through a fluid conduit 46. When the fluid pressure in the conduit 34 increases, the fluid pressure in the conduit 46 increases. A biasing spring 47 urges the relief valve 45 toward a closed condition.

If the fluid pressure in the conduit 34 increases above a predetermined fluid pressure, the fluid pressure in the conduit 46 increases above a value sufficient to urge the relief valve 45 to an open condition against the biasing force of the spring 47. When the relief valve 45 is in an open condition, fluid flows from the conduit 34 to the outlet port of the relief valve 45 to vent the pressure in the conduit 34. The outlet port of the relief valve 45 communicates with the conduit 38. The relief valve 45 opens to vent pressure in the conduit 34 so as to prevent the occurrence of an excessive fluid pressure condition in the conduit 34.

Bypass Valve

The conduit 34 also communicates with the inlet port of the flow dividing bypass valve 40 of known construction. The outlet port of the bypass valve 40 communicates through the conduit 29 with the reservoir 28. A biasing spring 42 urges the bypass valve 40 toward a closed condition.

A fluid conduit 41 communicates between the conduit 38 and the bypass valve 40. The conduit 41 conducts a fluid pressure signal to urge the bypass valve 40 open. The fluid pressure signal in conduit 41 depends upon the fluid pressure in the conduit 38. The fluid pressure signal in the conduit 41 increases when the fluid pressure in the conduit 38 increases and decreases when the fluid pressure in the conduit 38 decreases.

When the bypass valve 40 is in an open condition, fluid flows from the conduit 34 through the bypass valve 40 to the conduit 29 into the reservoir 28. When the bypass valve is in the fully closed condition, the bypass valve 40 does not allow fluid to flow from the conduit 34 to the conduit 29.

An orifice 50, preferably a venturi orifice, is located in the return fluid conduit 38. Preferably, the orifice 50 is a component of the Eaton BB Series power steering pump. A fluid conduit 49 communicates between the bypass valve 40 and the orifice 50 located in the conduit 38. The conduit 49 conducts a fluid pressure signal to the bypass valve 40 to control operation of the bypass valve 40. The magnitude of the fluid pressure signal in conduit 49 depends upon the rate of fluid flow through the orifice 50. The fluid pressure signal in conduit 49 is lower than atmospheric pressure. Due to the venturi effect of the venturi orifice 50, the fluid pressure signal in the conduit 49 increases when the rate of fluid flow through the orifice 50 decreases and decreases when the rate of fluid flow through the orifice 50 increases. When the fluid pressure signal in the conduit 49 decreases, the bypass valve 40 is able to move more easily toward an open condition. Thus, when the rate of fluid flow through the orifice 50 increases, the bypass valve 40 is able to move more easily toward an open condition. It should be apparent that the pressure signal in conduit 49 and the pressure signal in conduit 41 change together and act on the bypass valve 40.

Flow, as described above in reference to the pump 26, always meets or exceeds the amount required to steer the vehicle at minimum engine speed. Hence, higher engine speed produces flow in excess of that required for proper steering. The excess flow becomes exaggerated at higher vehicle speeds where less effort and slower steering rates are required. The excess flow must be returned to the reservoir 28. This invention is intended to return excess flow to the reservoir 28 with a minimum of energy loss.

Power Steering Valve

Figure 3:
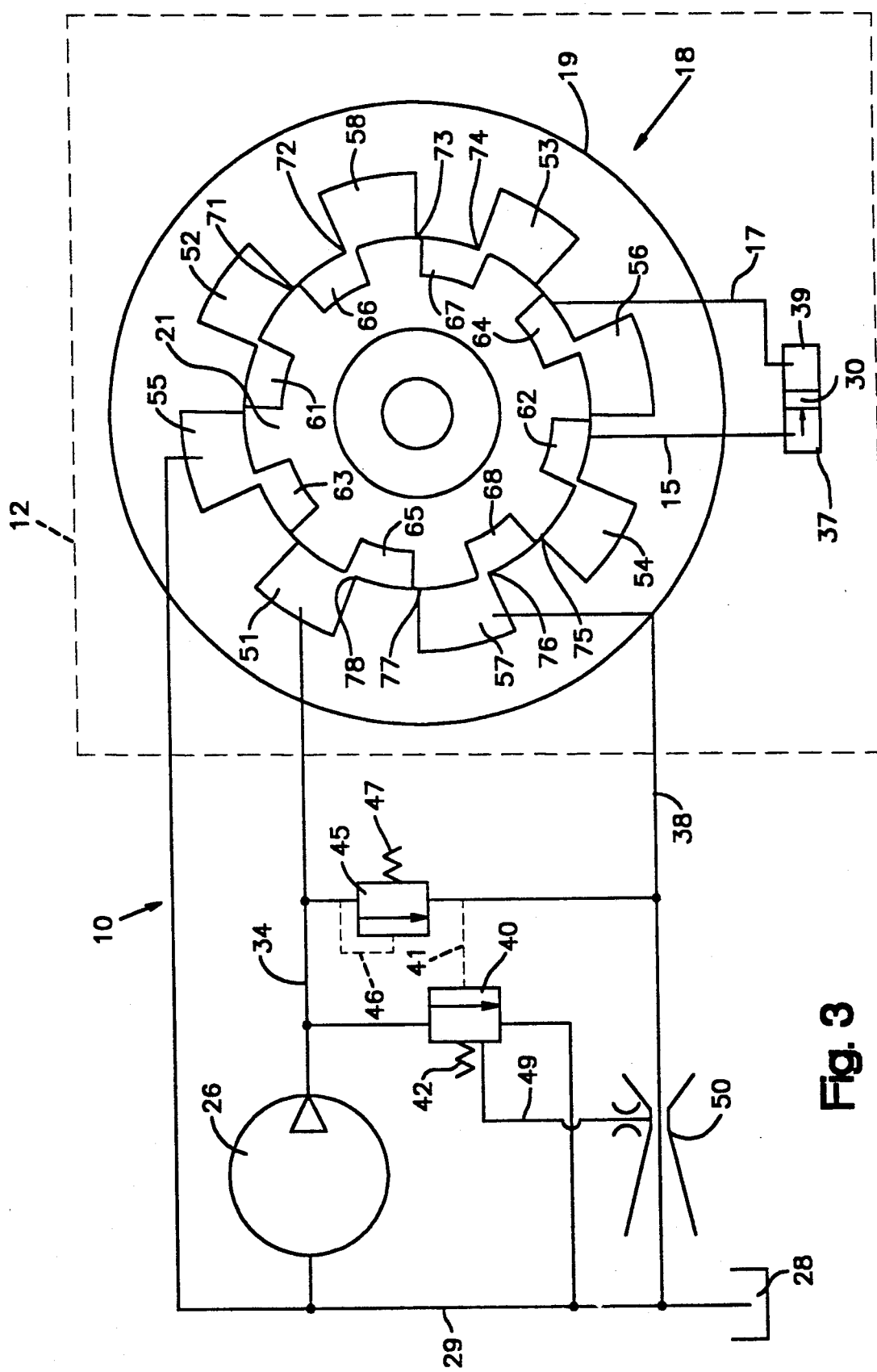
FIGS. 3 and 4 are schematic illustrations similar to FIG. 2 and showing the steering valve in different positions.
Figure 4:
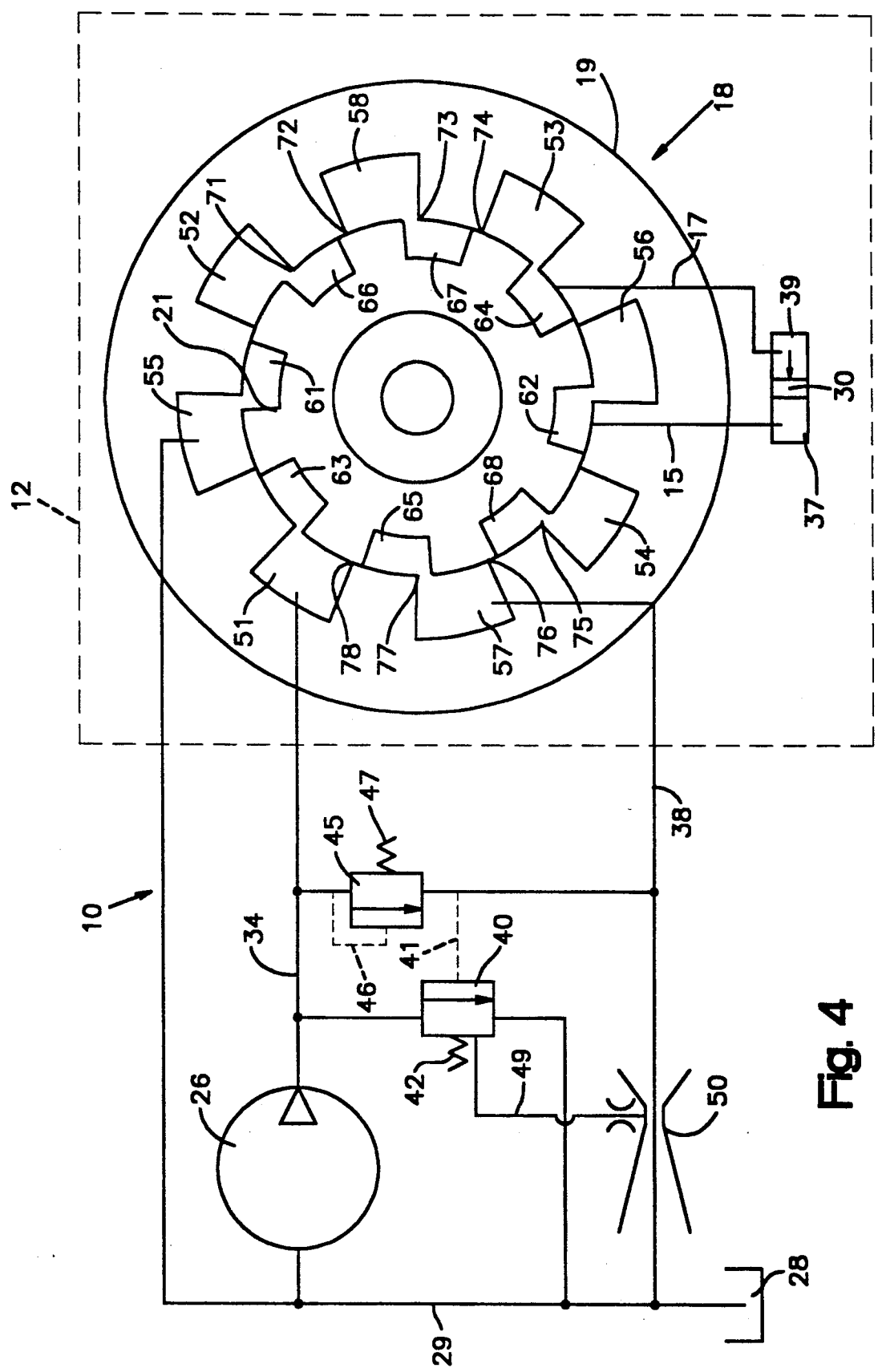

The steering valve 18 comprises an outer sleeve member 19 and an inner core member 21, shown schematically in FIGS. 2-4. The core member 21 is disposed inside the sleeve member 19 and is coaxial with the sleeve member 19. A torsion bar 23 acts between the core member 21 and the sleeve member 19. The sleeve member 19 is connected with the piston 30 and is rotatable upon axial movement of the piston 30 due to the action of a ball and screw connection 32 (shown schematically in FIG. 1) between the piston 30 and the sleeve member 19.

The core member 21 is attached to an input shaft 11 which is turned upon manual turning of a steering wheel (not shown). When the input shaft 11 is turned, the torsion bar 23 twists and the core member 21 rotates relative the sleeve member 19. The structure and operation of the steering valve 18 are disclosed in U.S. Pat. No. 4,942,803.

The sleeve member 19 has a number of equally spaced apart passages 51-58 extending radially through the sleeve member 19. The core member 21 has a number of axially extending grooves 61-68 circumferentially spaced apart around the outer periphery of the core member 21. The grooves 61-68 in the core member 21 and the passages 51-58 in the sleeve member 19 cooperate to define a plurality of fluid paths described hereinbelow.

Four passages 51-54 in the sleeve member 19 communicate in a known manner with the conduit 34 which communicates with the outlet port of the pump 26. For simplicity purposes, the drawings show only passage 51 communicating with the conduit 34. Two passages 55, 56 in the sleeve member 19 communicate in a known manner with the conduit 29 which communicates with the reservoir 28. For simplicity purposes, the drawings show only passage 55 communicating with the conduit 29. Two fluid passages 57, 58 in the sleeve member 19 communicate in a known manner with the conduit 38 which communicates through the orifice 50 with the reservoir 28. For simplicity purposes, the drawings show only passage 57 communicating with the conduit 38.

Two grooves 61, 62 in the core member 21 communicate in a known manner through a fluid conduit 15 with the chamber portion 37 of the power steering motor 20. For simplicity purposes, the drawings show only the groove 62 communicating with the chamber portion 37. Two grooves 63, 64 in the core member 21 communicate in a known manner through a fluid conduit 17 with the chamber portion 39 of the power steering motor 20. For simplicity purposes, the drawings show only the groove 64 communicating with the chamber portion 39. Each of two grooves 65, 68 in the core member 21 is connectable in fluid communication with the fluid passage 57 in the sleeve member 19. Each of two grooves 66, 67 in the core member 21 is connectable in fluid communication with the fluid passage 58 in the sleeve member 19.

The grooves 65-68 on the core member 21 have eight tapered pressure modulating control edges 71-78. For the purpose of illustration, the edges 71-78 are shown exaggerated in the drawings. Each of the edges 71-78 is tapered to avoid an abrupt closing between a groove on the core member 21 and an associated passage on the sleeve member 19. The edge 71 is located between the passage 52 and the groove 66, and the edge 72 is located between the groove 66 and the passage 58. The edge 73 is located between the passage 58 and the groove 67 and the edge 74 is located between the groove 67 and the passage 53. The edge 75 is located between the passage 54 and the groove 68, and the edge 76 is located between the groove 68 and the passage 57. The edge 77 is located between the passage 57 and the groove 65, and the edge 78 is located between the groove 65 and the passage 51. The edges of each of the grooves 61-64 are not modified, i.e., not tapered.

Neutral Condition of Steering Valve

When the vehicle engine is off, the pump 26 is not pumping any fluid through the conduit 34, the bypass valve 40 is closed, the relief valve 45 is closed, and the steering valve 18 is in its neutral position shown in FIG. 2. At low vehicle engine speeds and during no steering, such as during engine idling, the pump 26 outputs fluid to the conduit 34 and the steering valve 18 is in its neutral position.

Referring to FIG. 2, in the neutral position of the steering valve 18, fluid flows from the passage 51 across the edge 78 into the groove 65 and in turn flows across the edge 77 into the passage 57. Fluid also flows from the passage 54 across the edge 75 into the groove 68 and in turn flows across the edge 76 into the passage 57. Fluid flows from the passage 52 across the edge 71 into the groove 66 and in turn flows across the edge 72 into the passage 58. Fluid also flows from the passage 53 across the edge 74 into the groove 67 and in turn flows across the edge 73 into the passage 58. Fluid then flows from the passages 57, 58 through the conduit 38 and the orifice 50 into the reservoir 28.

Also, in the neutral position of the steering valve 18, the grooves 61, 63 communicate with the passage 55 and the grooves 62, 64 communicate with the passage 56. Since the passages 55, 56 communicate through the conduit 29 with the reservoir 28, the chamber portions 37, 39 of the power steering motor 20 are in communication with each other and with the reservoir 28.

The fluid flow through the conduit 38 and the orifice 50 results in pressure signals being communicated to the bypass valve 40. These signals coupled with the biasing force of the spring 42 cause the bypass valve 40 to open to bypass fluid from the conduit 34 through the conduit 29 into the reservoir 28. For example, at an engine idle speed of 600 RPM, the flow rate of the fluid through the bypass valve 40 is preferably about 3.1 gallons per minute (GPM) while the flow rate of the fluid through the orifice 50 is at a predetermined low constant rate of preferably about 0.9 GPM. Since the rate of fluid flow through the orifice 50 is relatively low during engine idle in a nonsteering condition, the rate of fluid flow through the steering valve 18 is relatively low.

When the vehicle engine speed increases with the steering valve 18 in its neutral condition, the speed of the pump 26 increases. Thus, the fluid flow through the conduit 38 and the orifice 50 increases. Thus, the fluid pressure signal in the conduit 49 decreases, and the fluid pressure signal in the conduit 41 increases. When the vehicle engine speed decreases, the speed of the pump 26 decreases. Thus, the rate of fluid flow through the conduit 38 and the orifice 50 decreases. Thus, the fluid pressure signal in the conduit 49 increases and the fluid pressure signal in the conduit 41 decreases. The bypass valve 40 is controlled by the fluid pressure signals in the conduits 41, 49 and the biasing force of the spring 42 to maintain the predetermined low constant fluid flow rate of 0.9 GPM through the orifice 50 as vehicle engine speed increases and decreases.

More specifically, if the fluid flow rate through the orifice 50 decreases below the predetermined low constant rate of 0.9 GPM, then the bypass valve 40 moves to a more closed position. When the bypass valve 40 moves to a more closed position, the fluid flow rate through the main conduit 34 increases. When the fluid flow rate through the main conduit 34 increases, the fluid flow rate through the orifice 50 increases. Thus, the fluid flow rate through the main conduit 34 increases to maintain the fluid flow rate through the orifice 50 at the predetermined low constant rate of 0.9 GPM when the fluid flow rate through the orifice 50 decreases.

If the fluid flow rate through the orifice 50 increases above the predetermined low constant rate of 0.9 GPM, then the bypass valve 40 moves to a more open position. When the bypass valve 40 moves to a more open position, the fluid flow rate through the main conduit 34 decreases. When the fluid flow rate through main conduit 34 decreases, the fluid flow rate through the orifice 50 decreases. Thus, the fluid flow rate through the main conduit 34 decreases to maintain the fluid flow rate through the orifice 50 at the predetermined low constant rate of 0.9 GPM when the fluid flow rate through the orifice 50 increases. Preferably, the maximum flow rate at which fluid can be bypassed through the bypass valve 40 is 19.1 GPM. By maintaining the predetermined low constant fluid flow rate of 0.9 GPM through the orifice 50 as the engine speed increases or decreases in a nonsteering condition, the amount of fluid flow delivered through the steering valve 18 is maintained at the predetermined low constant fluid flow rate.

Steering in One Direction

When the vehicle steering wheel is turned in one direction, typically the torsion bar 23 twists and the core member 21 rotates in one direction relative to the sleeve member 19. Referring to FIG. 3, the core member 21 and the sleeve member 19 are in different positions relative to each other as compared with the relative positions of the core member 21 and the sleeve member 19 in the neutral position of the steering valve 18 shown in FIG. 2. The core member 21, as shown in FIG. 3, is rotated clockwise relative to the sleeve member 19 from the neutral position shown in FIG. 2.

When the core member 21 moves from the position of FIG. 2 to the position of FIG. 3, the grooves 63, 64 in the core member 21 remain in communication with the passages 55, 56, respectively, in the sleeve member 19. The chamber portion 39 of the power steering motor 20 is in communication with the grooves 63, 64 communicating through the passages 55, 56 to the conduit 29. Since the conduit 29 communicates with the reservoir 28, the chamber portion 39 of the power steering motor 20 is connected to the reservoir 28 when the core member 21 is in the position of FIG. 3.

Also, when the core member 21 moves from the position of FIG. 2 to the position of FIG. 3, the grooves 61, 62 in the core member 21 switch to communicate with the passages 52, 54, respectively, in the sleeve member 19. The chamber portion 37 of the power steering motor 20 communicates with the grooves 61, 62 communicating through the passages 52, 54 to the conduit 34 when the core member 21 is in the position of FIG. 3. Since the conduit 34 communicates with the outlet port of the pump 26, the chamber portion 37 of the power steering motor 20 is connected to the outlet port of the pump 26. Thus, the chamber portion 37 of the power steering motor 20 is at a relatively high fluid pressure when the core member 21 is in the position of FIG. 3.

Since the chamber position 37 is at a relatively high fluid pressure and the chamber portion 39 is at a relatively low fluid pressure when the core member 21 and the sleeve member 19 are in the positions of FIG. 3, the piston 30 moves axially to the right (as seen in FIG. 3). When the piston 30 moves axially to the right, the steerable vehicle wheels 14, 16 are turned in an associated direction through the vehicle steering linkage 22. As the piston 30 moves axially to the right, the sleeve member 19 rotates relative to the core member 21 in a follow-up manner due to the action of the ball and screw connection 32 between the piston 30 and the sleeve member 19 as shown in U.S. Pat. No. 4,942,803.

Also, when the core member 21 moves to its position shown in FIG. 3, the fluid pressure in the conduit 38 decreases and the fluid pressure in the conduit 41 decreases. This occurs because of the demand for fluid by the power steering motor 20 from passages 51-54 which are also communicating with the conduit 38. Thus, the flow through orifice 50 decreases. As a result, the forces acting on the bypass valve 40 urge the bypass valve 40 toward a more closed condition. When the bypass valve 40 is urged toward a more closed condition, the fluid flow rate through the steering valve 18 to the power steering motor 20 increases and less fluid is bypassed through the bypass valve 40 to the conduit 29. This increases the fluid pressure in conduit 38 and the fluid flow rate through the orifice 50 so that the fluid flow rate through the orifice 50 is maintained at the predetermined low constant value of 0.9 GPM.

When the core member 21 moves from the position of FIG. 2 to the position of FIG. 3, the fluid pressure in the chamber portion 37 of the steering motor 20, the fluid pressure in the grooves 61, 62 in the core member 21, and the fluid pressure in the passages 51-54 in the sleeve member 19 are at approximately the same fluid pressure since the edges of each of the grooves 61, 62 have no modifications such as being tapered. At the same time, fluid continues to flow across the modification edges 71-78. The fluid flow across the modification edges 71-78 is the same as the fluid flow through the conduit 38 and the orifice 50 into the reservoir 28. Since the fluid flow through the orifice 50 is maintained at the predetermined low constant value of 0.9 GPM, the fluid flow across the modification edges 71-78 is also maintained at 0.9 GPM. Thus, the fluid flow across the modification edges 71-78 is maintained at 0.9 GPM when the core member 21 moves from the position of FIG. 2 to the position of FIG. 3.

Steering in Opposite Direction

When the vehicle steering wheel is turned in the opposite direction, typically the torsion bar 23 twists in the opposite direction and the core member 21 rotates in the opposite direction relative to the sleeve member 19. Referring to FIG. 4, the core member 21 and the sleeve member 19 are in different positions relative to each other as compared with the relative positions of the core member 21 and the sleeve member 19 in the neutral position of the steering valve 18 as shown in FIG. 2. The core member 21, as shown in FIG. 4, is rotated counter-clockwise relative to the sleeve member 19 from the neutral position shown in FIG. 2.

When the core member 21 moves from the position of FIG. 2 to the position of FIG. 4, the grooves 61, 62 in the core member 21 are in communication with the passages 55, 56, respectively, in the sleeve member 19. The chamber portion 37 of the power steering motor 20 is in communication with the grooves 61, 62 communicating through the passages 55, 56 to the conduit 29. Since the conduit 29 communicates with the reservoir 28, the chamber portion 37 of the power steering motor 20 is connected to the reservoir 28 when the core member 21 is in the position of FIG. 4.

Also, when the core member 21 moves from the position of FIG. 2 to the position of FIG. 4, the grooves 63, 64 in the core member 21 switch to communicate with the passages 51, 53, respectively, in the sleeve member 19. The chamber portion 39 of the power steering motor 20 communicates with the grooves 63, 64 communicating through the passages 51, 53, to the conduit 34 when the core member 21 is in the position of FIG. 4. Since the conduit 34 communicates with the outlet port of the pump 26, the chamber portion 39 of the power steering motor 20 is connected to the outlet port of the pump 26 and thus at a relatively high fluid pressure when the core member 21 is in the position of FIG. 4.

Since the chamber portion 39 is at a relatively high fluid pressure and the chamber portion 37 is at a relatively low fluid pressure when the core member 21 and the sleeve member 19 are in the positions of FIG. 4, the piston 30 moves axially to the left (as seen in FIG. 4). When the piston 30 moves axially to the left, the steerable vehicle wheels 14, 16 are turned in an associated direction through the vehicle steering linkage 22. As the portion 30 moves axially to the left, the sleeve member 19 rotates relative to the core member 21 in the follow-up manner due to the action of the ball and screw connection 32 between the piston 30 and the sleeve member 19 as shown in U.S. Pat. No. 4,942,803.

The bypass valve 40 is controlled to maintain the predetermined low constant fluid flow rate of 0.9 GPM through the orifice 50 when the core member 21 moves from the position shown in FIG. 2 to the position shown in FIG. 4. The operation and control of the bypass valve 40 to maintain the predetermined low constant fluid flow rate of 0.9 GPM through the orifice 50 when the steering valve 18 is moved from the position shown in FIG. 2 to the position shown in FIG. 4 are the same as the operation and control of the bypass valve 40 to maintain the predetermined low constant fluid flow rate of 0.9 GPM through the orifice 50 when the steering valve 18 is moved from the position shown in FIG. 2 to the position shown in FIG. 3 as already described.

When the core member 21 moves from the position of FIG. 2 to the position of FIG. 4, the fluid pressure in the chamber portion 37 of the steering motor 20, the fluid pressure in the grooves 63, 64 in the core member 21, and the fluid pressure in the passages 51-54 in the sleeve member 19 are at approximately the same fluid pressure since the edges of each of the grooves 63, 64 have no modifications such as being tapered. At the same time, fluid continues to flow across the modification edges 71-78. The fluid flow across the modification edges 71-78 is the same as the fluid flow through the conduit 38 and the orifice 50 into the reservoir 28. Since the fluid flow through the orifice 50 is maintained at the predetermined low constant value of 0.9 GPM, the fluid flow across the modification edges 71-78 is also maintained at 0.9 GPM. Thus, the fluid flow across the modification edges 71-78 is maintained at 0.9 GPM when the core member 21 moves from the position of FIG. 2 to the position of FIG. 4.

Operational Feature

The vehicle power steering system 10 has certain unique and advantageous operational features. For example, the power steering system 10 has relatively low horsepower consumption. This is because the pump 26 is pumping only preferably 0.9 GPM of fluid through the steering valve 18 when no steering is being effected. This is in contrast to steering systems such as shown in U.S. Pat. No. 4,768,605 which attempt to provide a constant flow of about 4 GPM to a steering valve at all times. Since only 0.9 GPM of fluid flows through the steering valve 18 when no steering is being effected, the pressure drop across the pump 26 is low and the amount of horsepower consumed by the pump 26 is relatively low. Further, noise generated by fluid flow through the power steering system 10 is minimized since only 0.9 GPM of fluid flows through the steering valve 18 when no steering is being effected.

The vehicle power steering system 10 also functions to provide a variable fluid flow rate to the steering valve 18 depending upon the rate of turning of the steering wheel. For example, as the rate of turning of the steering wheel increases, the pressure in the conduit 38 tends to decrease because of the demand for fluid by the steering motor 20. Thus, the fluid rate through the orifice 50 tends to decrease. Hence, the forces acting on the bypass valve 40 tend to close the bypass valve 40 thereby increasing fluid flow to the steering valve 18 so that the fluid flow through the conduit 38 is maintained constant. This is in contrast to the steering system shown in U.S. Pat. No. 4,768,605 which operates to provide a constant fluid flow to a steering valve regardless of how fast the steering wheel is turned.

During steering, the fluid flow rate through the orifice 50 remains at the predetermined low constant value of 0.9 GPM independent of the steering wheel angular velocity, i.e., the rate at which the steering wheel is turned and thus the rate at which the core member 21 is turned relative to the sleeve member 19. This occurs because the core member 21 and the valve sleeve member 19 move into the same relative positions for a given steering load regardless of how fast the steering wheel is turned. This occurs because (1) the sum of the flow rates across the modification edges 71-78 from passages 51-54 tends to remain at 0.9 GPM, and (2) there is a minimum, if any, pressure drop between the passages 51-54 and the pressurized chamber of the steering motor 20 since there are no modification edges between passages 51-54 and the pressurized chamber of the steering motor 20.

The vehicle power steering system 10 also functions to provide reduced steering efforts during vehicle parking as compared to the steering system shown in U.S. Pat. No. 4,768,605. In the power steering system 10, the flow area in the vicinity of the modification edges 71-78 is relatively small. Thus, the torsion bar 23 needs to be twisted only a small amount to restrict the flow area in the vicinity of the modification edges 71-78 and thereby cause a pressure increase in the passages 51-54 for a given steering load. This also results in a decrease in response time, as compared to the steering system shown in U.S. Pat. No. 4,768,605.

Second Embodiment

Figure 5:
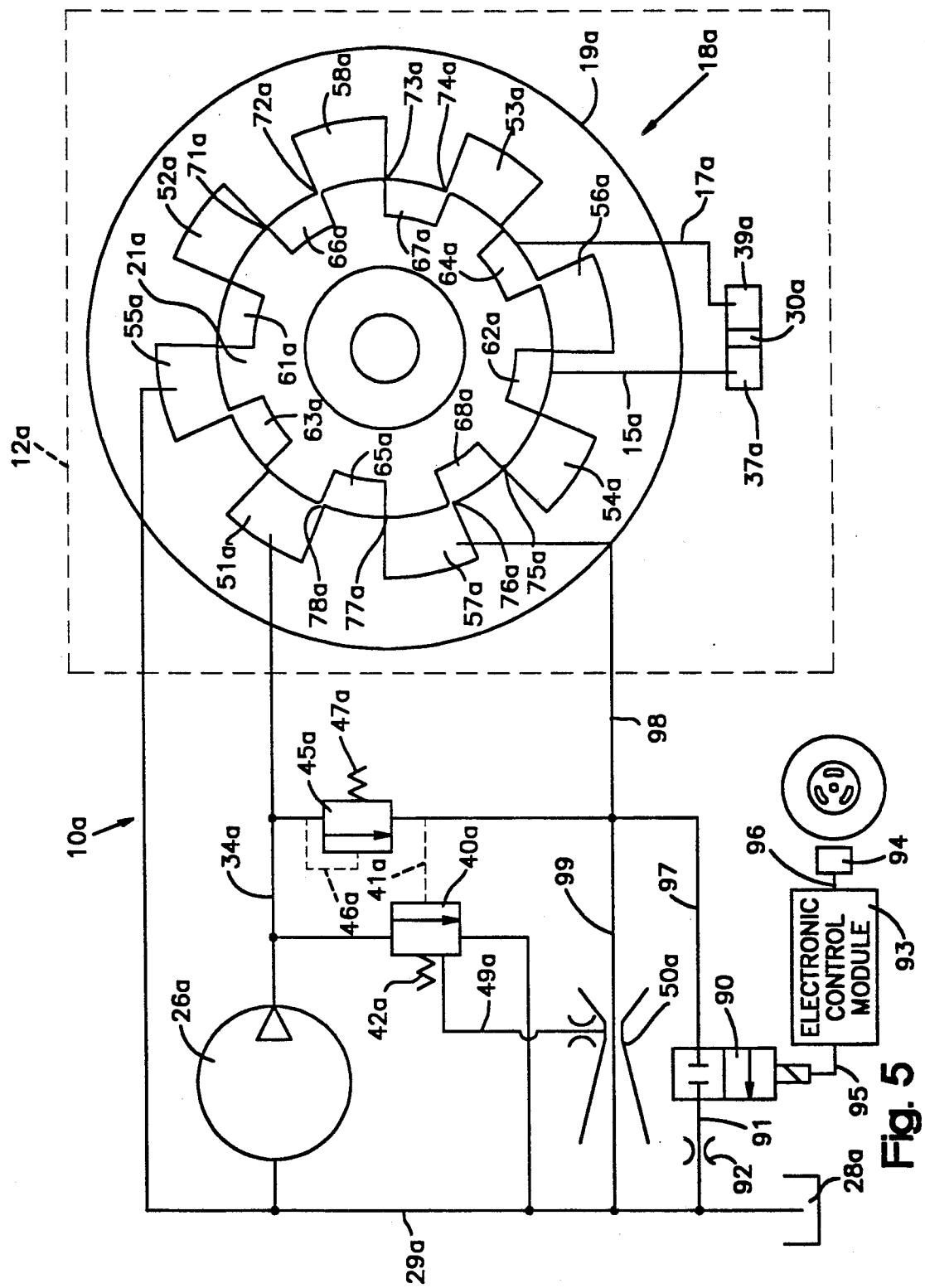
FIG. 5 is a schematic illustration of another embodiment of a power steering system constructed in accordance with the present invention.

Another embodiment of the present invention is schematically illustrated in FIG. 5. Since the embodiment illustrated in FIG. 5 is generally similar to the embodiment illustrated in FIGS. 1-4, similar numerals are utilized to designate similar components, the suffix letter "a" being added to the numerals associated with the embodiment of FIG. 5.

Referring to FIG. 5, the steering valve 18a is shown in its neutral position. A controllable flow control valve 90 has one side communicating with a fluid conduit 97. The fluid conduit 97 communicates through a fluid conduit 98 with the steering valve 18a. Fluid flows from the steering valve 18a into the conduit 98 which, in turn, flows into a conduit 97 to the flow control valve 90 and into a conduit 99 to the orifice 50a. The opposite side of the flow control valve 90 communicates through a fluid conduit 91 to an orifice 92. The orifice 92 communicates through the conduit 29a with the reservoir 28a. The orifice 92 is the same size as the orifice 50a. In an open position of the flow control valve 90, fluid flows from the conduit 97 through the flow control valve 90 and through the orifice 92 to the reservoir 28a. In the fully closed position of the flow control valve 90, there is no communication from the conduit 97 through the flow control valve 90 and through the orifice 92 to the reservoir 28a.

The flow control valve 90 is controlled in response to an electrical output signal on line 95 from an electronic control module 93. The output signal on line 95 from the electronic control module 93 is provided in response to a speed signal on line 96 from a vehicle speed sensor 94. The speed signal on line 96 from the vehicle speed sensor 94 is indicative of the ground speed of the vehicle. The flow control valve 90 is therefore controlled in response to vehicle ground speed. The flow control valve 90 is in its fully open position when vehicle ground speed is at zero. The flow control valve 90 moves progressively to a more closed position as vehicle ground speed increases. The flow control valve 90 is in its fully closed position when vehicle ground speed is above a predetermined speed value.

When the steering valve 18a is in its neutral position and the flow control valve 90 is in its fully open position, i.e., when vehicle ground speed is at zero, fluid flows from the conduit 97 through the flow control valve 90 and through the orifice 92 into the reservoir 28a at a predetermined flow rate of preferably 0.9 GPM. At the same time, the fluid flow rate through the conduit 99 and through the orifice 50a into the reservoir 28a is maintained at the predetermined low constant value of 0.9 GPM. The fluid flow through the conduit 98 from the steering valve 18a is the sum of the fluid flow through the conduit 98 to the flow control valve 90 and the fluid flow through the conduit 99 to the orifice 50a. Thus, the fluid flow rate through the steering valve 18a is at 1.8 GPM when the steering valve 18a is in its neutral position and the flow control valve 90 is in its fully open position.

As vehicle ground speed increases, the flow control valve 90 moves to a more closed position and the fluid flow rate through the flow control valve 90 decreases from 0.9 GPM. At the same time, the fluid flow rate through the conduit 99 and through the orifice 50a into the reservoir 28a is maintained at the predetermined low constant value of 0.9 GPM. Thus, the fluid flow rate through the steering valve 18a decreases from 1.8 GPM when the steering valve 18a is in its neutral position and the flow control valve 90 moves to a more closed position.

When the steering valve 18a is in its neutral position and the flow control valve 90 is in its fully closed position, i.e., when vehicle ground speed is above the predetermined speed value, no fluid flows from the conduit 97 through the flow control valve 90 and through the orifice 92 into the reservoir 28a. At the same time, the fluid flow rate through the conduit 99 and through the orifice 50a into the reservoir 28a is maintained at the predetermined low constant value of 0.9 GPM. Since no fluid flows through the conduit 97, the fluid flow rate through the conduit 98 from the steering valve 18a is the same as the fluid flow rate through the conduit 99 to the orifice 50a. Thus, the fluid flow rate through the steering valve 18a is at 0.9 GPM when the steering valve 18a is in its neutral position and the flow control valve 90 is in its fully closed position.

From the above, it should be clear that the fluid flow rate through the steering valve 18a over the modification edges 74a–78a and through the conduit 98 at low vehicle speeds is higher in the embodiment of FIG. 5 than in the embodiment of FIGS. 1–4. This results in reduced steering effort during parking because the core member 21a in the embodiment of FIG. 5 does not have to move as far as the core member 21 in the embodiment of FIGS. 1–4 to provide a desired pressure drop across the modification edges 74a–78a. Thus, the torsion bar 23a in the embodiment of FIG. 5 does not have to be twisted as much as the torsion bar 23 in the embodiment of FIGS. 1–4 for a given steering load.

Also, if it is desired to maintain the same steering effort in the embodiment of FIG. 5 as in the embodiment of FIGS. 1–4 during parking, a greater spring rate torsion bar could be used in the embodiment of FIG. 5. If a greater spring rate torsion bar were used in the embodiment of FIG. 5, this would result in greater steering effort being required at high vehicle speeds, which may be desirable for certain vehicles.

It should be apparent from the above that the applicant has provided a new and improved power steering system and that certain changes and modifications may be made therein by one skilled in the art. It is intended to cover such changes and modifications coming within the scope of the appended claims.

Having described preferred embodiments of the invention, the following is claimed:

1. An apparatus comprising:
   a power steering motor operatively connectable with steerable vehicle wheels for, when connected with the vehicle wheels, steering the vehicle wheels;
   a fluid reservoir;
   a pump having an inlet port in communication with said reservoir and an outlet port;
   an actuatable power steering valve having a neutral position in which fluid flows through said steering valve to said reservoir and an actuated position in which fluid flows through said steering valve to said steering motor and to said reservoir;
   main conduit means for conducting fluid from the outlet port of said pump to said steering valve;
   return conduit means for conducting fluid from said steering valve to said reservoir when said steering valve is in its neutral position and in its actuated position;
   a bypass valve for bypassing fluid from said main conduit means to said reservoir;
   an orifice located in said return conduit means; and
   means for controlling said bypass valve in response to a pressure drop across said orifice located in said return conduit means.

2. The apparatus of claim 1 wherein said return conduit means includes
   a first conduit portion communicating with said steering valve, said reservoir and said bypass valve, and
   a second conduit portion communicating with said steering valve and said reservoir,
   said orifice being located in said first conduit portion and controlling said bypass valve to maintain a constant fluid flow rate through said first conduit portion,
   said steering valve having passages for directing fluid from said steering motor to said second conduit portion for flow to said reservoir.

3. The apparatus of claim 2 wherein said means for controlling said bypass valve includes a control fluid conduit communicating between said bypass valve and said orifice and conducting a fluid pressure signal to control said bypass valve, the magnitude of the fluid pressure signal in said control fluid conduit varying as a function of the amount of fluid flow through said orifice, the fluid pressure signal in said control fluid conduit tending to increase when the amount of fluid flow through said orifice tends to decrease and tending to decrease when the amount of fluid flow through the orifice tends to increase.

4. The apparatus of claim 2 wherein said orifice is a venturi orifice.

5. The apparatus of claim 2 wherein said steering valve includes a sleeve member and a core member disposed inside said sleeve member and coaxial with said sleeve member, said sleeve member and said core member being rotatable relative to each other.

6. The apparatus of claim 5 wherein said sleeve member has a number of equally spaced apart passages extending radially through said sleeve member and said core member has a number of axially extending grooves circumferentially spaced apart around the outer periphery of said core member, said grooves in said core member and said passages in said sleeve member cooperating to define a plurality of fluid paths through said steering valve.

7. The apparatus of claim 6 wherein certain of said grooves in said core member have modification edges over which fluid flows from said main conduit means to said first conduit portion of said return conduit means.

8. An apparatus comprising:
a power steering motor operatively connectable with steerable vehicle wheels for, when connected with the vehicle wheels, steering the vehicle wheels, said power steering motor having a piston and second fluid chamber portions on opposite sides of said piston;
a fluid reservoir;
a pump having an inlet portion in communication with said reservoir and an outlet port;
an actuatable power steering valve defining first, second, and third paths, said steering valve having a neutral position in which fluid flows through said steering valve to said reservoir through first path defined by said steering valve, said steering valve having an actuated position in which (i) fluid flows through said steering valve to said reservoir through said first path defined by said steering valve, (ii) fluid flows through said steering valve to one chamber portion of said steering motor through said second path defined by said steering valve, and (iii) fluid flows through said steering valve from the other chamber portion of said steering motor through said third path defined by said steering valve;
main conduit means for conducting fluid from the outlet port of said pump to said steering valve;
a first return conduit for conducting fluid from said first path to said reservoir when said steering valve is in its neutral position and when said steering valve is in its actuated position;
a second return conduit for conducting fluid from said third path to said reservoir;
a bypass valve for bypassing fluid from said main conduit means to said reservoir;
an orifice located in said first return conduit; and
means for controlling said bypass valve in response to a pressure drop across said orifice located in said first return conduit to maintain a constant fluid flow through said first path and said first return conduit.

9. The apparatus of claim 8 wherein said steering valve includes a sleeve member and a core member disposed inside said sleeve member and coaxial with said sleeve member, said sleeve member and said core member being rotatable relative to each other.

10. The apparatus of claim 9 wherein said sleeve member has a number of equally spaced apart passages extending radially through said sleeve member and said core member has a number of axially extending grooves circumferentially spaced apart around the outer periphery of said core member, said grooves in said core member and said passages in said sleeve member cooperating to define said first, second, and third paths.

11. The apparatus of claim 10 wherein certain of said grooves in said core member have modification edges over which fluid flows in said first path to said first return conduit.

12. The apparatus of claim 11 wherein certain of said grooves in said core member have non-modified edges over which fluid flows in said second path to said one chamber portion of said steering motor.

13. The apparatus of claim 8 further including a second, orifice in parallel to said orifice in said first return conduit, a flow control valve movable between an open position and a closed position for controlling fluid flow through said second orifice, and vehicle speed sensing means for controlling said flow control valve to control fluid flow through said second orifice.

14. The apparatus of claim 13 wherein said vehicle speed sensing means comprises means for closing said flow control valve as vehicle speed increases to reduce flow through said second orifice as vehicle speed increases.

* * * * *

UNITED STATES PATENT AND TRADEMARK OFFICE
CERTIFICATE OF CORRECTION

PATENT NO. : 5,184,693

DATED : February 9, 1993

INVENTOR(S) : Laurence L. Miller

It is certified that error appears in the above-identified patent and that said Letters Patent is hereby corrected as shown below:

Column 13, line 34, before "second" insert -- first and --.

Column 14, line 41, delete ",".

Signed and Sealed this

Eighteenth Day of January, 1994

Attest:

BRUCE LEHMAN

*Attesting Officer*     *Commissioner of Patents and Trademarks*